United States Patent
Chung et al.

(10) Patent No.: US 7,218,371 B2
(45) Date of Patent: *May 15, 2007

(54) LIQUID CRYSTAL DISPLAY

(75) Inventors: Woo-Suk Chung, Anyang (KR); Chi-Woo Kim, Seoul (KR); Bo-Young An, Daeku (KR); Hyong-Gon Lee, Yongin (KR); Sung-Hee Cho, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/166,010

(22) Filed: Jun. 24, 2005

(65) Prior Publication Data

US 2005/0237466 A1    Oct. 27, 2005

Related U.S. Application Data

(63) Continuation of application No. 10/178,016, filed on Jun. 20, 2002, now Pat. No. 6,927,830.

(30) Foreign Application Priority Data

Jul. 18, 2001    (KR)    ............................ 2001-0043031
Aug. 21, 2001    (KR)    ............................ 2001-0050420

(51) Int. Cl.
  *G02F 1/1345*    (2006.01)
  *G02F 1/1343*    (2006.01)
(52) U.S. Cl. ....................... 349/149; 349/143; 349/146

(58) Field of Classification Search ........ 349/123–124, 349/149, 146, 158, 143, 43; 345/80, 90, 345/32
See application file for complete search history.

(56) References Cited

U.S. PATENT DOCUMENTS

| 5,285,301 | A | * | 2/1994 | Shirahashi et al. | ......... 349/143 |
| 5,432,626 | A | * | 7/1995 | Sasuga et al. | .................. 349/58 |
| 5,719,648 | A | * | 2/1998 | Yoshii et al. | .................. 349/42 |
| 6,927,830 | B2 | * | 8/2005 | Chung et al. | ............... 349/149 |

* cited by examiner

*Primary Examiner*—Mike Qi
(74) *Attorney, Agent, or Firm*—F. Chau & Associates, LLC

(57) ABSTRACT

In a liquid crystal display, a plurality of gate lines and data lines are provided on a first substrate including a display area as a screen, and a peripheral area external to the display area wherein a plurality of pixel electrodes are electrically connected to the gate lines and to the data lines, and some of the pixel electrodes extend to be located in the peripheral area; and optionally, a black matrix is formed on a second substrate disposed opposite to the first substrate for screening the extended portions of the pixel electrodes located in the peripheral area, a rubbing direction of aligning films is formed on the first and the second substrates towards the extended portions of the pixel electrodes located in the peripheral area so that impurity ions on the surface of the aligning film travel along the rubbing direction to stop at the extended portions of the pixel electrodes, and an image defect area caused by the impurity ions is screened with the black matrix.

15 Claims, 11 Drawing Sheets

LIQUID CRYSTAL DISPLAY

CROSS-REFERENCE TO RELATED APPLICATION

This is a continuation application of U.S. application Ser. No. 10/178,016 filed Jun. 20, 2002 U.S. Pat. No. 6,927,830, the disclosure of which is incorporated by reference herein in its entirety.

BACKGROUND OF THE INVENTION (a) Field of the Invention

The present invention relates to a liquid crystal display.

(b) Description of the Related Art

A typical liquid crystal display ("LCD") includes an upper panel having a common electrode and an array of color filters, and a lower panel having a plurality of pixel electrodes and thin film transistors ("TFT"s). A pair of aligning films are coated on the upper and the lower panels, and a liquid crystal layer is interposed between the aligning films of the upper and the lower panels. The orientations of molecules of the liquid crystal layer are changed by adjusting an electric field generated by the potential difference between the pixel electrodes and the common electrode, which are applied with appropriate voltages. The change of the orientations of the liquid crystal molecules causes the transmittance of light passing through the LCD to be varied, thereby obtaining desired images.

During the fabricating process of such a conventional LCD, impurity ions are often generated and remained on the surface of the aligning films. When the fabricated LCD operates for a time, these impurity ions travel along an alignment direction formed by rubbing the aligning films, to gather at one corner of the liquid crystal display. As a result, this causes a defect that one corner of a display area is bright when displaying dark images.

SUMMARY OF THE INVENTION

Embodiments of the present invention provide for liquid crystal displays having improved image qualities. According to an embodiment of the present invention, at least one portion of at least one pixel electrode is located in a peripheral area external to a display area.

A liquid crystal display is provided, which includes: a first insulating substrate including a display area as a screen and a peripheral area external to the display area; a plurality of signal lines provided on the first substrate; and a plurality of pixel electrodes electrically connected to the signal lines, wherein the plurality of pixel electrodes include at least one first electrode having a first portion located in the peripheral area and at least one second electrode located in the display area.

Preferably, the liquid crystal display further includes a second insulating substrate disposed opposite the first substrate and a black matrix provided on the second substrate, wherein the black matrix screens the first portion of the at least one first electrode.

It is preferable that the liquid crystal display further includes a common electrode provided on the second substrate and disposed opposite the plurality of pixel electrodes, wherein the plurality of pixel electrodes and the common electrode are applied with signals having periodically inverting polarity, respectively.

An aligning layer is preferably provided on the first substrate, and the rubbing direction preferably head toward the first portion of the at least one first electrode.

According to an embodiment of the present invention, the at least one first electrode further includes a second portion located in the display area. The area of the at least one first electrode is preferably larger than the area of the at least one second electrode.

According to another embodiment of the present invention, the first portion of the at least one first electrode forms an entire portion of the at least one first electrode.

According to an embodiment of the present invention, the plurality of pixel electrodes are arranged in a matrix, and the plurality of the signal lines include a plurality of gate lines substantially parallel to each other and extending in a row direction and a plurality of data lines substantially parallel to each other and extending in a column direction, and the liquid crystal display further includes a plurality of switching elements transmitting first signals from the plurality of data lines to the plurality of pixel electrodes in response to second signals from the plurality of gate lines.

Preferably, the at least one first electrode is located at an edge column or an edge row of the matrix.

According to an embodiment of the present invention, the liquid crystal display further includes a controller controlling the liquid crystal display.

According to an embodiment of the present invention, the plurality of data lines include at least one first data line electrically connected to the at least one first electrode and at least one second data line electrically connected to the at least one second electrode, and the at least one first data line and the at least one second data line are electrically connected to the controller via different paths.

According to another embodiment of the present invention, the plurality of gate lines include at least one first gate line electrically connected to the at least one first electrode and at least one second gate line electrically connected to the at least one second electrode, and the at least one first gate line and the at least one second gate line are electrically connected to the controller via different paths.

According to an embodiment of the present invention, the liquid crystal display further includes a printed circuit board ("PCB") having the controller therein or electrically connected to the controller, wherein the PCB includes a first signal path electrically connecting the at least one first data line or the at least one first gate line to the controller and a second signal path electrically connecting the at least one second data line or the at least one first gate line to the controller.

According to an embodiment of the present invention, the liquid crystal display further includes a tape carrier package connecting the PCB to the first substrate, and a driving circuit transmitting the first signals or the second signals to the at least one second data line or the at least one second gate line in response to a control signal from the controller. The driving circuit is preferably mounted as an integrated circuit chip on the tape carrier package or on the first substrate, or is directly formed on the first substrate with the same layers as the plurality of data lines, the plurality of gate lines and the plurality of switching elements.

According to an embodiment of the present invention, the driving circuit has at least one first terminal electrically connected to the at least one first data line or the at least one first gate line and a second terminal electrically connected to the first signal path so that the at least one first data line or the at least one gate line is electrically connected to the first signal path.

According to another embodiment of the present invention, the tape carrier package has at least one lead wire electrically connected between the first signal path and the at least one first data line or the at least one gate line. Preferably, the liquid crystal display further includes a voltage level shifter increasing voltage level from the controller, wherein the at least one first data line or the at least one first gate line is electrically connected to the controller via the lead wire of the tape carrier package and the voltage level shifter.

According to an embodiment of the present invention, the liquid crystal display further includes a driving voltage generator provided on the PCB and generating a gate-on voltage, wherein the tape carrier package has at least one lead wire electrically connected between the at least one first gate line and the driving voltage generator.

According to an embodiment of the present invention, an edge column and an edge row of the matrix include the at least one first electrode.

BRIEF DESCRIPTION OF THE DRAWINGS

The above and other objects and advantages of the present invention will become more apparent by describing preferred embodiments thereof in detail with reference to the accompanying drawings, in which.

DETAILED DESCRIPTION OF PREFERRED EMBODIMENTS

Figure 1:
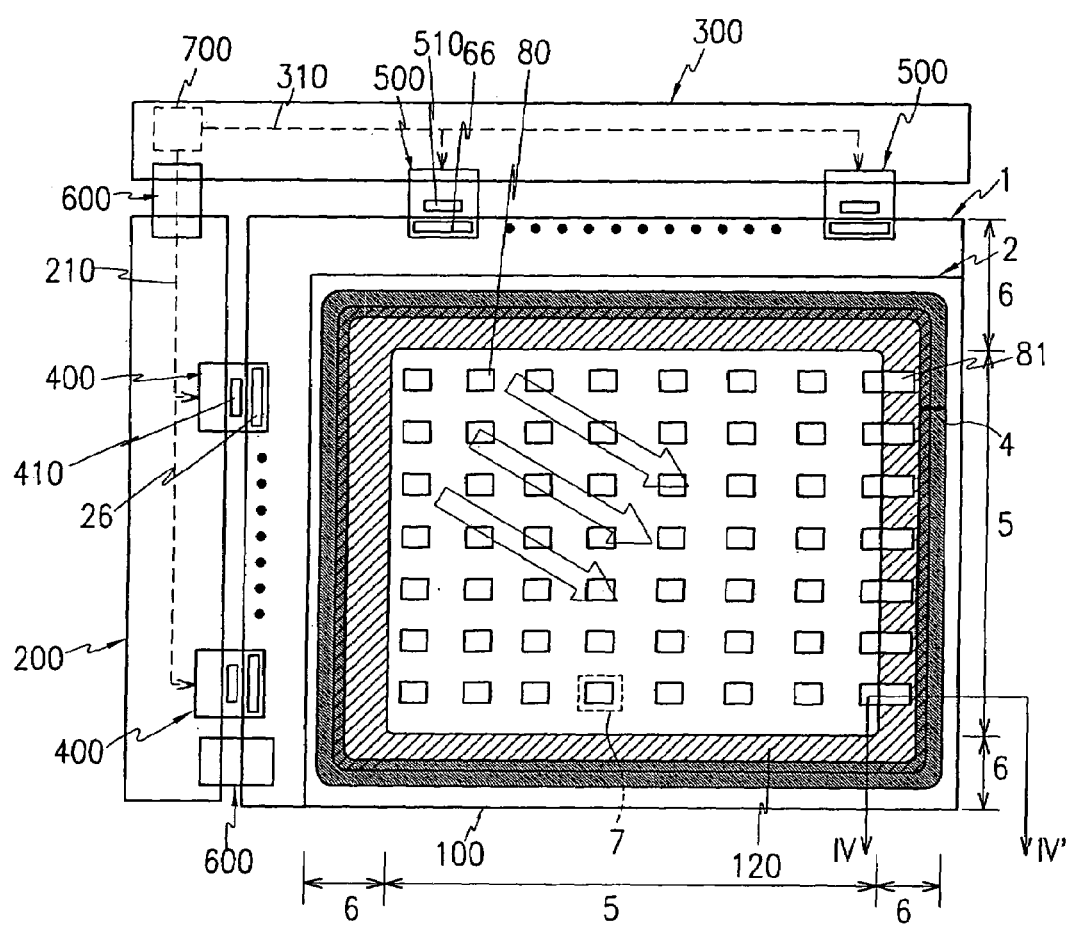
FIGS. 1 and 2 are schematic plan views of LCDs according to embodiments of the present invention, respectively.

The present invention will be described hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present. Then, liquid crystal displays according to embodiments of the present invention will be described with reference to the drawings.

With reference to FIGS. 1 to 4, the structures of LCDs according to embodiments of the present invention will be described.

Figure 2:
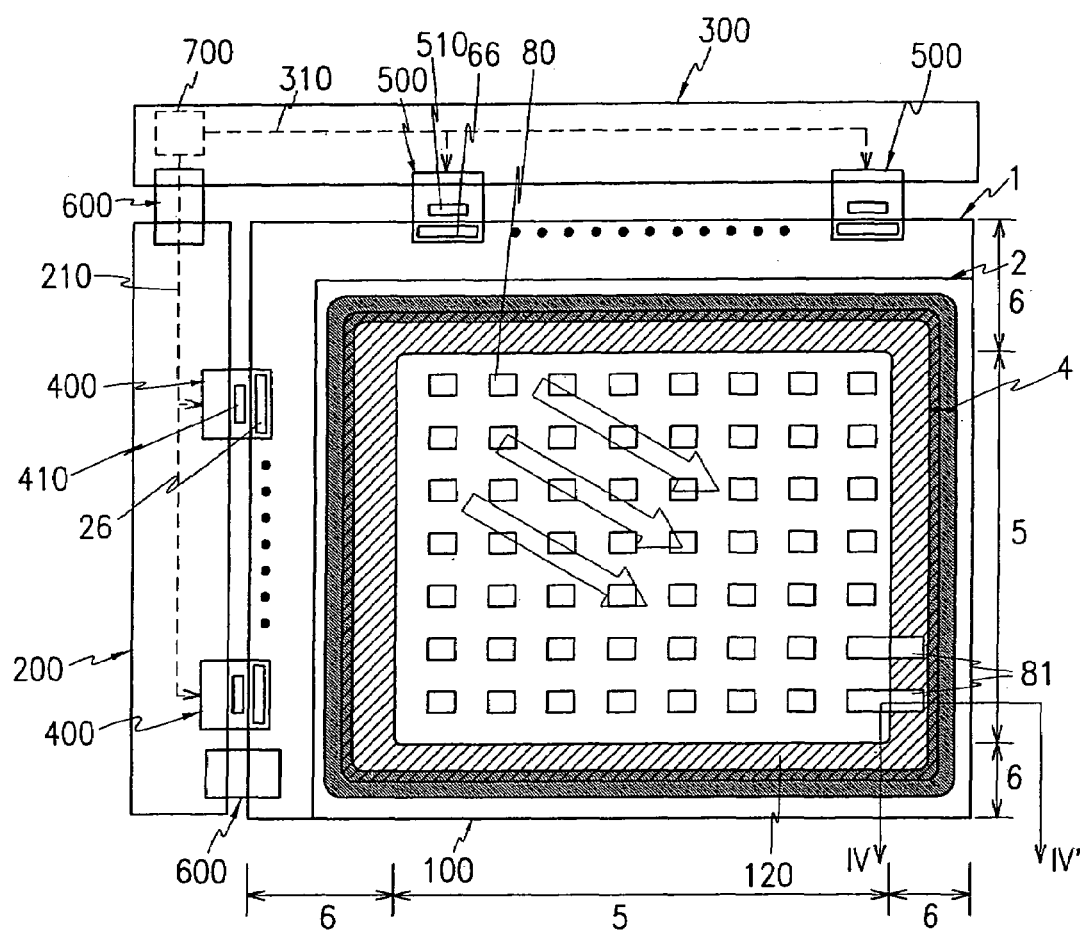
Figure 3A:
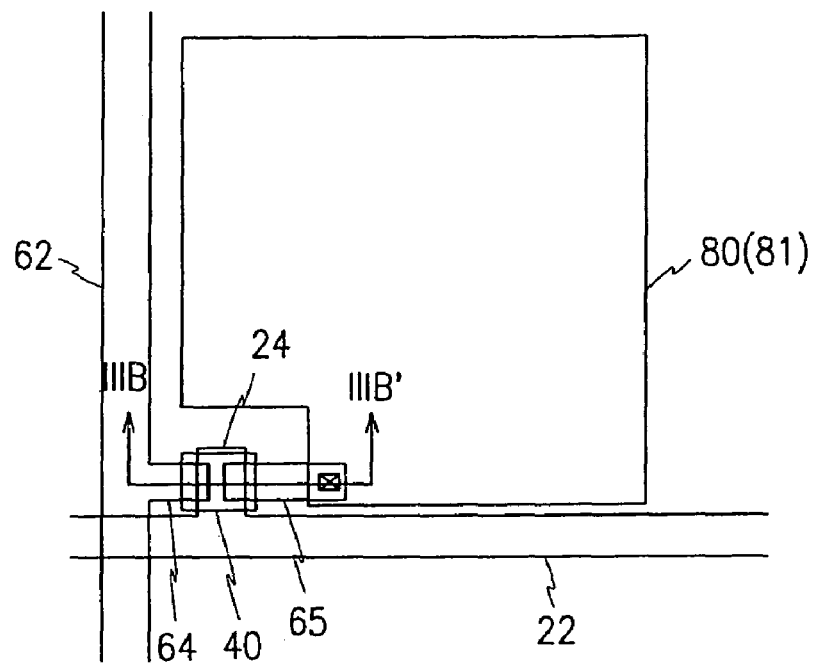
FIG. 3A is an enlarged layout view of a pixel area shown in FIGS. 1 and 2.
Figure 3B:
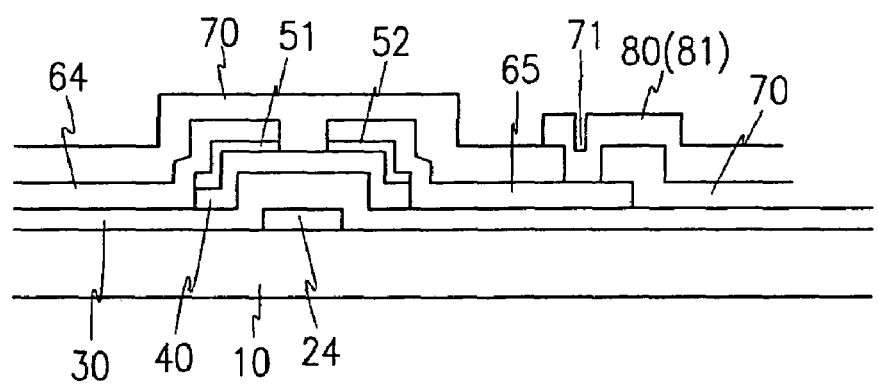
FIG. 3B is a cross-sectional view taken along the line IIIB–IIIB' in FIG. 3A.
Figure 4:
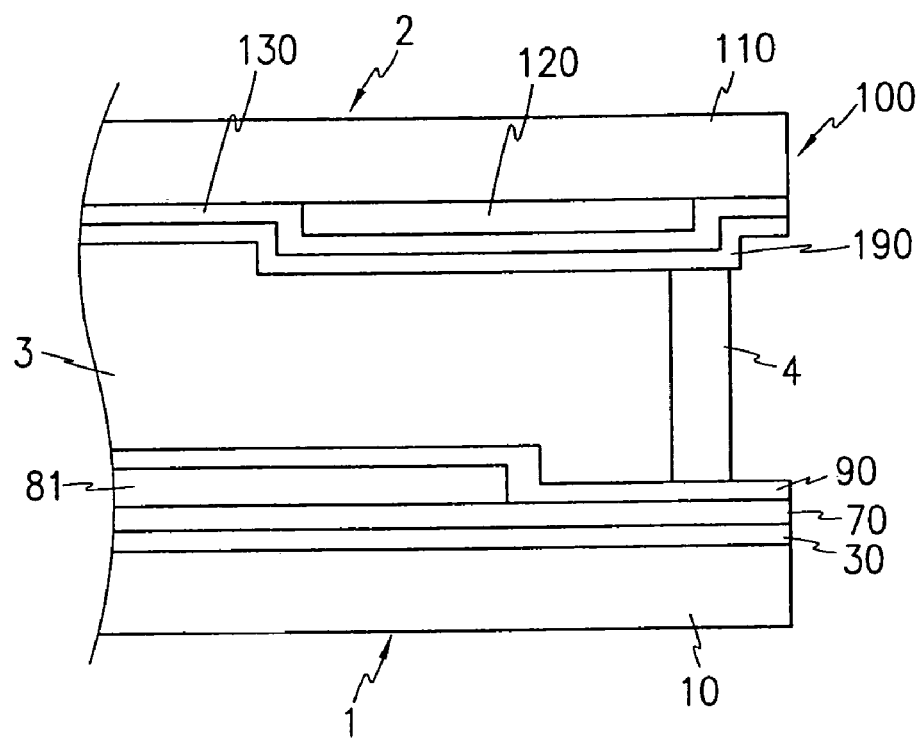
FIG. 4 is a cross-sectional view of an LCD taken along the line IV–IV' in FIGS. 1 and 2.

FIGS. 1 and 2 are schematic plan views of LCDs according to embodiments of the present invention, respectively. FIG. 3A is an enlarged layout view of a pixel area shown in FIGS. 1 and 2, FIG. 3B is a cross-sectional view taken along the line IIIB–IIIB' in FIG. 3A, and FIG. 4 is a cross-sectional view of LCDs taken along the line IV–IV' in FIGS. 1 and 2.

As shown in FIGS. 1 and 2, each of LCDs according to the embodiments of the present invention includes a liquid crystal panel assembly 100, a gate printed circuit board ("PCB") 200, a data PCB 300, a plurality of gate tape carrier packages ("TCP"s) 400, a plurality of data TCPs 500, and two flexible printed circuit ("FPC") films 600. The gate TCPs 400 are attached to the panel assembly 100 and the gate PCB 200, and the data TCPs 500 are attached to the panel assembly 100 and the data PCB 300. The FPC films 600 connect the panel assembly 100 to the gate PCB 200 and connect the gate PCB 200 to the data PCB 300. The gate PCB 200 and the data PCB 300 are disposed external to the left and the right edges of the panel assembly 100, respectively.

As shown in FIGS. 1 to 4, the panel assembly 100 includes a thin film transistor (TFT) array panel 1 and a color filter panel 2, opposite each other. The panel assembly 100 further includes a liquid crystal layer 3 of liquid crystal material disposed in a gap between the two panels 1 and 2, and a sealant 4 supporting the two panels 1 and 2 and sealing the liquid crystal material.

With reference to FIGS. 1 to 4, the TFT array panel 1 will be described in detail.

A gate wire transmitting scanning signals or gate signals is formed on an insulating substrate 10 preferably made of transparent glass. The gate wire includes a plurality of gate lines 22 extending in a row direction, a plurality of gate electrodes 24 connected thereto, and a plurality of gate pads 26 connected to one ends of the gate lines 22.

The gate wire 22, 24 and 26 is covered with a gate insulating film 30, and a semiconductor layer 40 preferably made of amorphous silicon or polysilicon is formed on the gate insulating film 30 opposite the gate electrode 24. An ohmic contact layer having two separated portions 51 and 52 is formed on the semiconductor layer 40. The ohmic contact layer 51 and 52 is preferably made of amorphous silicon doped with high concentration N-type impurity such as phosphorous.

A data wire transmitting image signals or data signals is formed on the gate insulating film 30 and the ohmic contact layer 51 and 52. The data wire includes a plurality of data lines 62 extending in a column direction, a plurality of source electrodes 64 connected thereto, a plurality of drain electrodes 65 separated from the data lines 62 and the source electrodes 64, and a plurality of data pads 66 connected to one ends of the data lines 62.

One gate electrode 24, one source electrode 64 and one drain electrode 65 serve as three terminals of a TFT, and an exposed portion of the semiconductor layer 40 interposed between the source electrode 64 and the drain electrode 65 acts as a channel layer of the TFT.

Adjacent two gate lines 22 and adjacent two data lines 62 define a pixel area 7 as shown in FIGS. 1 and 3A.

The data wire 62, 64, 65 and 66, and exposed portions of the semiconductor layer 40 and the gate insulating film 30 are covered with a passivation layer 70, which has contact holes 71 exposing the drain electrodes 65.

A plurality of pixel electrodes 80 and 81, preferably made of transparent conducting material or opaque conducting material with high reflectivity, are disposed on the passivation layer 70. The pixel electrodes 80 and 81 are connected to the drain electrodes 65 through the contact holes 71 of the passivation layer 70 so that the TFTs provide the image signals from the data lines 62 to the pixel electrodes 80 and 81 in response to the scanning signals from the gate lines 22.

All the pixel electrodes 81 in the rightmost column as shown in FIG. 1, or some pixel electrodes 81 near the lower right corner in the rightmost column as shown in FIG. 2, are elongated in the row direction compared with other pixel electrodes 80.

An aligning film 90 forms an uppermost layer of the TFT array panel 1 as shown in FIG. 4, and the aligning film 90 is rubbed in a direction indicated by arrows shown in FIGS. 1 and 2, i.e., in the direction from the upper left to the lower right.

The TFT array panel 1 is divided into a display area 5 seen as a screen to a user of an LCD and a peripheral area 6 surrounding the display area. The pixel electrodes 81 in the rightmost column extend from the display area 5 to the peripheral area 6, while the other pixel electrodes 80 are remained within the display area 5. Most portions of the TFTs, the gate lines 22 and the data lines 66 are disposed in the display area 5, while the gate pads 26 and the data pads 66 are located in the peripheral area 6.

Next, the color filter panel 2 will be described with reference to FIGS. 1, 2 and 4.

A black matrix 120 preferably made of an organic material is formed on an insulating substrate 110 preferably made of transparent glass. The black matrix 120 surrounds and defines the display area 5. The black matrix 120 overlaps the extended right portions of the pixel electrodes 81 in the rightmost column. Although it is not shown, the black matrix 120 screens the borders between the pixel electrodes 80 and 81 to define pixel areas. Red, green and blue color filters (not shown) are formed in respective pixel areas of the display area 5. A common electrode 130 preferably made of transparent conducting material is formed on the color filters and the black matrix 120 and covers the entire area of the substrate 110. An aligning film 190 forms an uppermost layer of the color filter panel 2, and the rubbing direction thereof is the same as that of the aligning film 90 of the TFT array panel 1.

As can be seen in FIGS. 1 and 2, since the TFT array panel 1 is larger than the color filter panel 2, the gate pads 26 and the data pads 66 protrude from the color filter panel 2. The sealant 4 is located external to the display area 5 and interposed between the two panels 1 and 2. The sealant 4 partly overlaps the black matrix 120.

The gate PCB 200 and the data PCB 300 are electrically connected via the FPC film 600 therebetween for signal transmission. Signal paths 210 and 310 preferably made of conducting wires for transmitting signals are provided on the PCBs 200 and 300 and the FPC film 600 therebetween. An LCD controller 700 is provided on the data PCB 300 but it may be provided on the gate PCB 200. A driving voltage generator (900 in FIG. 10) is also provided on the gate PCB 200. The driving voltage generator 900 generates a gate-on voltage, a gate-off voltage and a common voltage as a reference voltage. A gray voltage generator (not shown) generating gray voltages is provided on the data PCB 300. At least one of the gate PCB 200 and the data PCB 300 may be omitted, and then the associated circuits and signal paths may be formed in the TFT array panel 1.

A plurality of gate driving integrated circuits (ICs) 410 and the data driving ICs 510, preferably made in chips, are mounted on the gate TCPs 400 and the data TCPs 500, respectively. A plurality of lead wires (not shown) connected between the gate driving ICs 410 and the signal path 210 and between the gate driving ICs and the gate pads 26 are formed on the gate TCPs 410. Another plurality of lead wires (not shown) connected between the data driving ICs 510 and the data pads 66 and between the gate driving ICs 410 and the gate pads 26 are formed on the data TCPs 500.

The gate TCPs 410 and the data TCPs 510 are respectively attached to the gate PCB 200 and the data PCB 300 to be electrically connected thereto, and are attached to the panel assembly 100 to be electrically connected to the gate pads 26 and the data pads 66, respectively. Alternatively, the gate driving ICs 410 and/or the data driving ICs 510 are mounted on the TFT array panel 1, which is called a COG (chip on glass) type. Alternatively, the gate driving ICs 410 and/or the data driving ICs 510 are substituted with driving circuits formed in the TFT array panel 1, which are made of the same layers as the gate lines 22, the data lines 62 and the TFTs. These alternatives may be applicable to subsequent embodiments The LCD controller 700 provides a plurality of red, green and blue gray signals for the data driving ICs 510 and a plurality of control signals for the driving ICs 410 and 510 via the signal paths 210 and 310 on the PCBs 200 and 300 and the FPC film 600 to control the driving ICs 410 and 510. The gate driving ICs 410 generate the scanning signals based on the gate-on voltage and the gate-off voltage from the driving voltage generator 900 to apply to the gate lines 22 via the gate pads 26 in synchronization with the control signals from the LCD controller 700. The data driving ICs 510 select the gray voltages from the gray voltage generator based on the gray signals from the LCD controller 700 to apply as the image signals to the appropriate data lines 62 via the data pads 66 in synchronization with the control signals from the LCD controller 700.

In this LCD, the impurity ions on the surface of the aligning films 90 and 190 travel along the rubbing direction, and gather at the right portions of the pixel electrodes 81 in the rightmost column, in particular, near the lower right corner. As described above, since the pixel electrodes 81 in the rightmost column overlap the black matrix 120, the area with defect image caused by such ions is screened by the black matrix 120.

The size of the pixel electrodes 81 is varied depending on the size of the image defected area.

Since the number of the pixel electrodes 81 having larger size shown in FIG. 2 is smaller than that shown in FIG. 1, the former has an advantage that the load of the entire driving circuits is reduced. However, since most of the load of the entire driving circuits is caused by signal wires and the load caused by the pixel electrodes 81 is very small, for example, about a hundredth of the wire load, it is also a good choice to adopt the structure of the latter embodiment.

The following embodiments of the present invention introduce a plurality of additional pixel electrodes external to a display area, which induce the image defect area to be generated out of the display area. These embodiments will be described in detail with reference to FIGS. 5 to 11.

Figure 5:
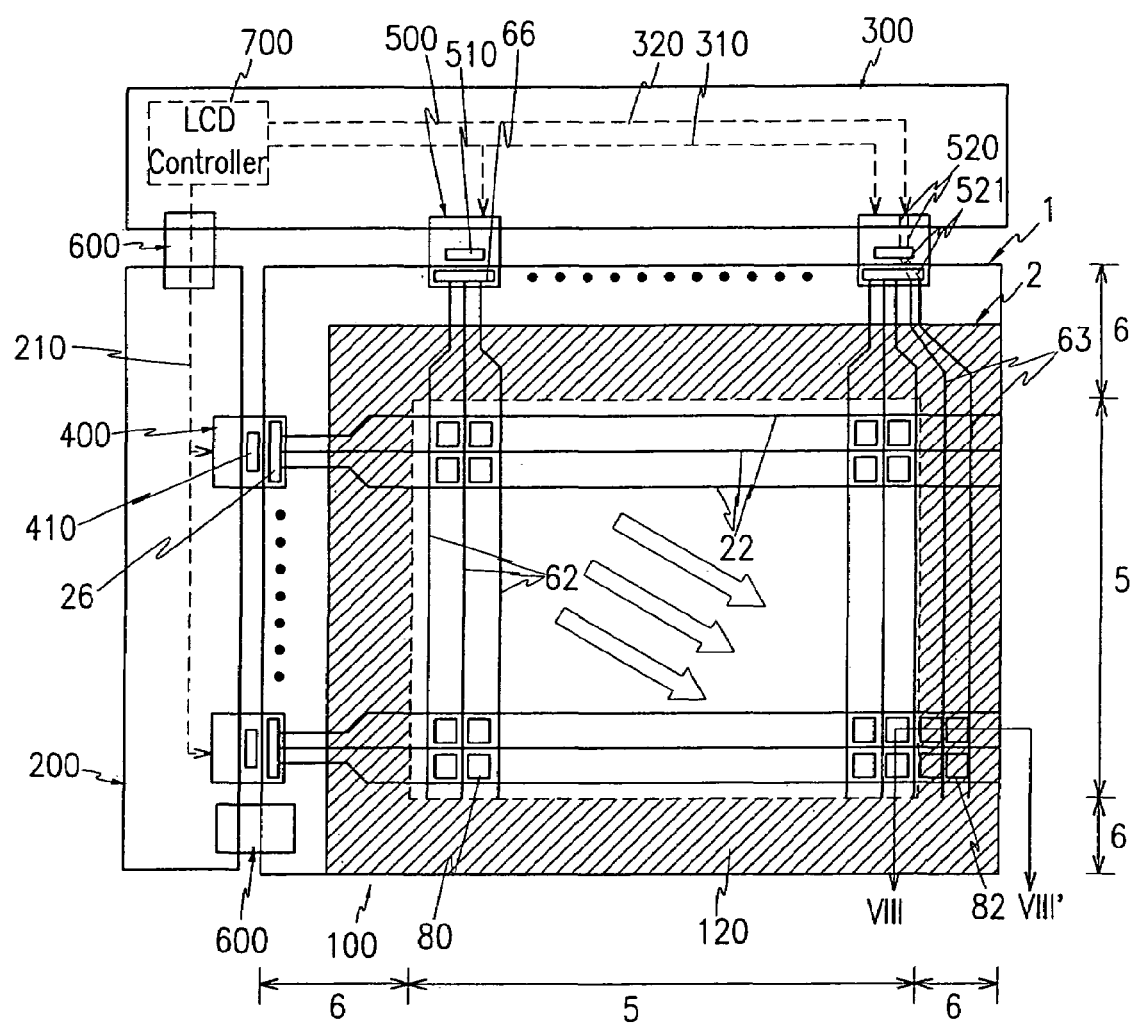
FIGS. 5 to 7 are schematic plan views of LCDs according to embodiments of the present invention, respectively.
Figure 6:
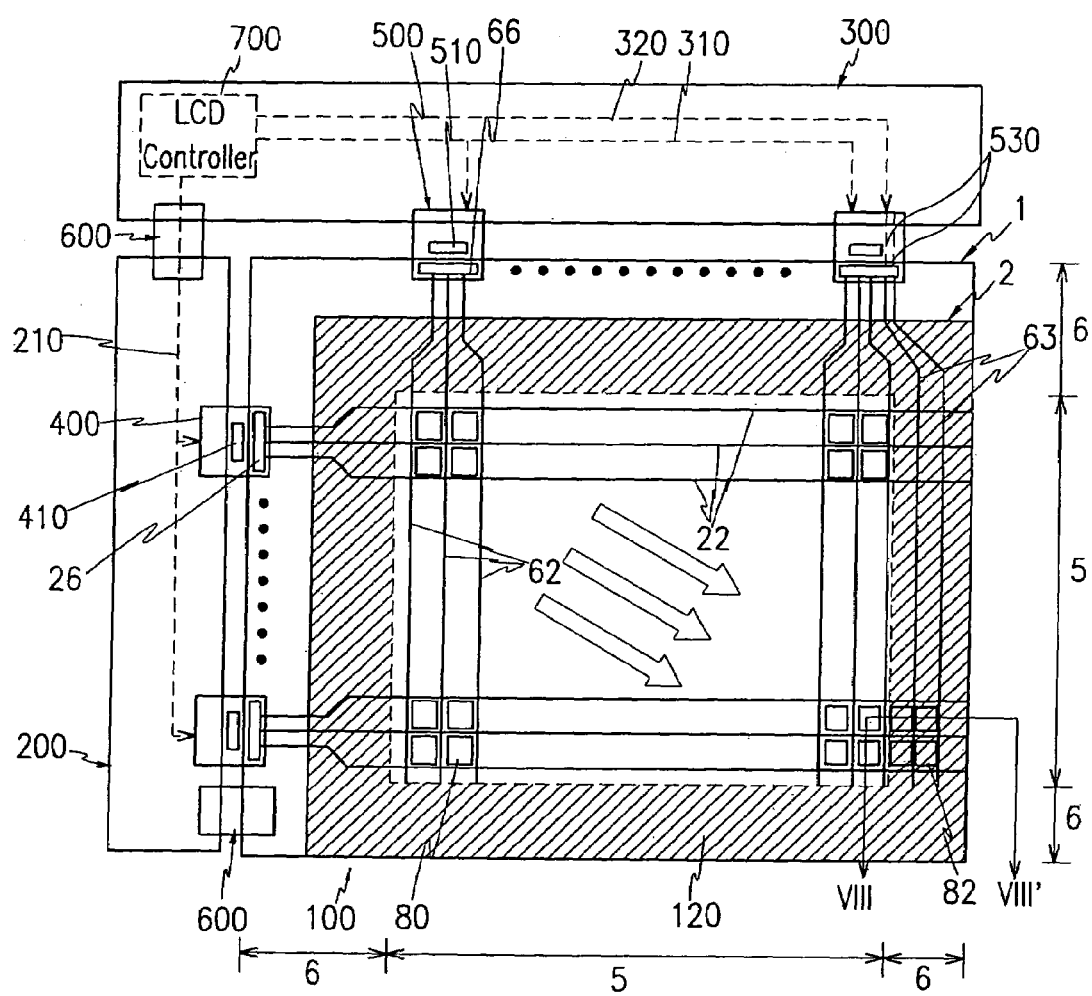
Figure 7:
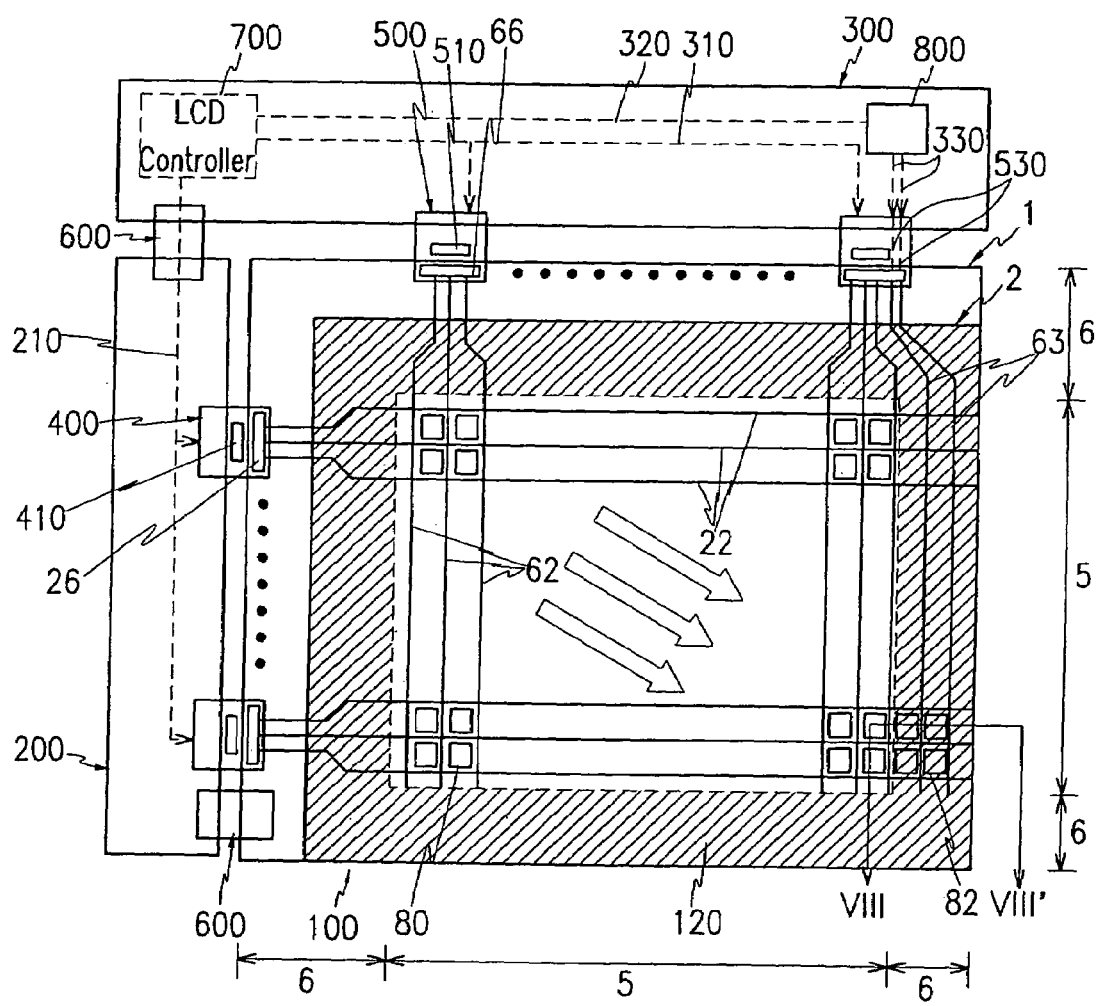
Figure 8:
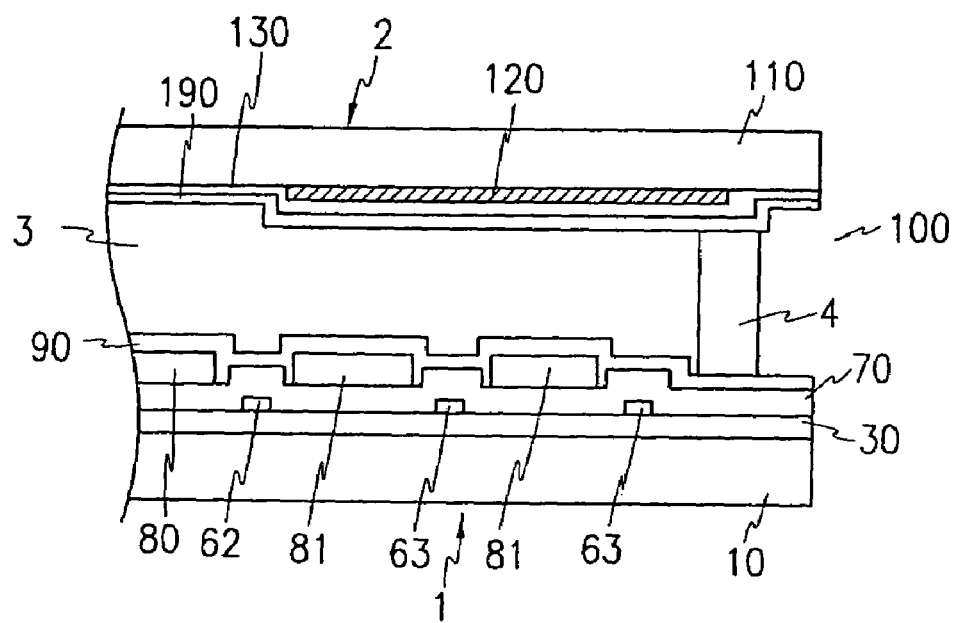
FIG. 8 is a cross-sectional view of an LCD taken along the line VIII–VIII' in FIGS. 5 to 7.
Figure 9:
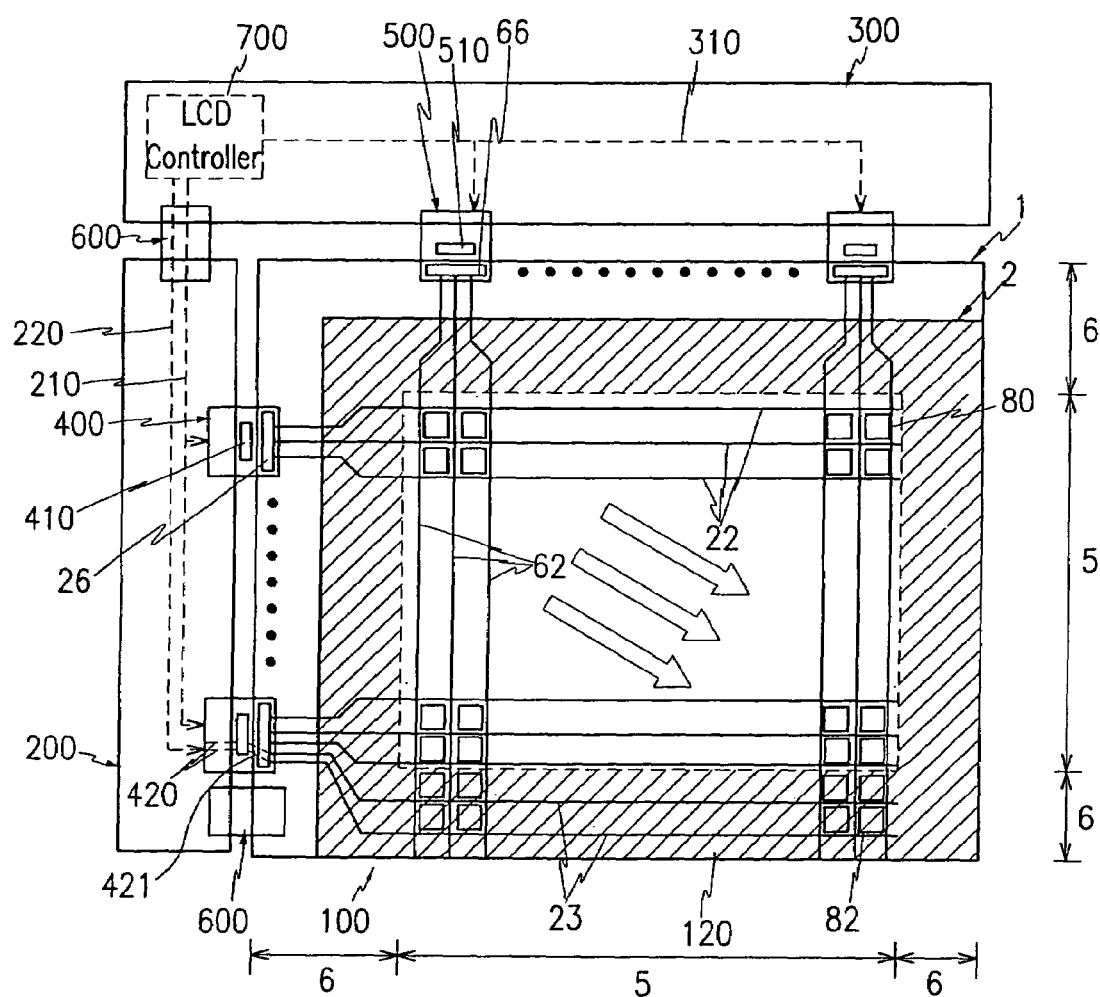
FIGS. 9 to 11 are schematic plan view of LCDs according to embodiments of the present invention, respectively.
Figure 11:
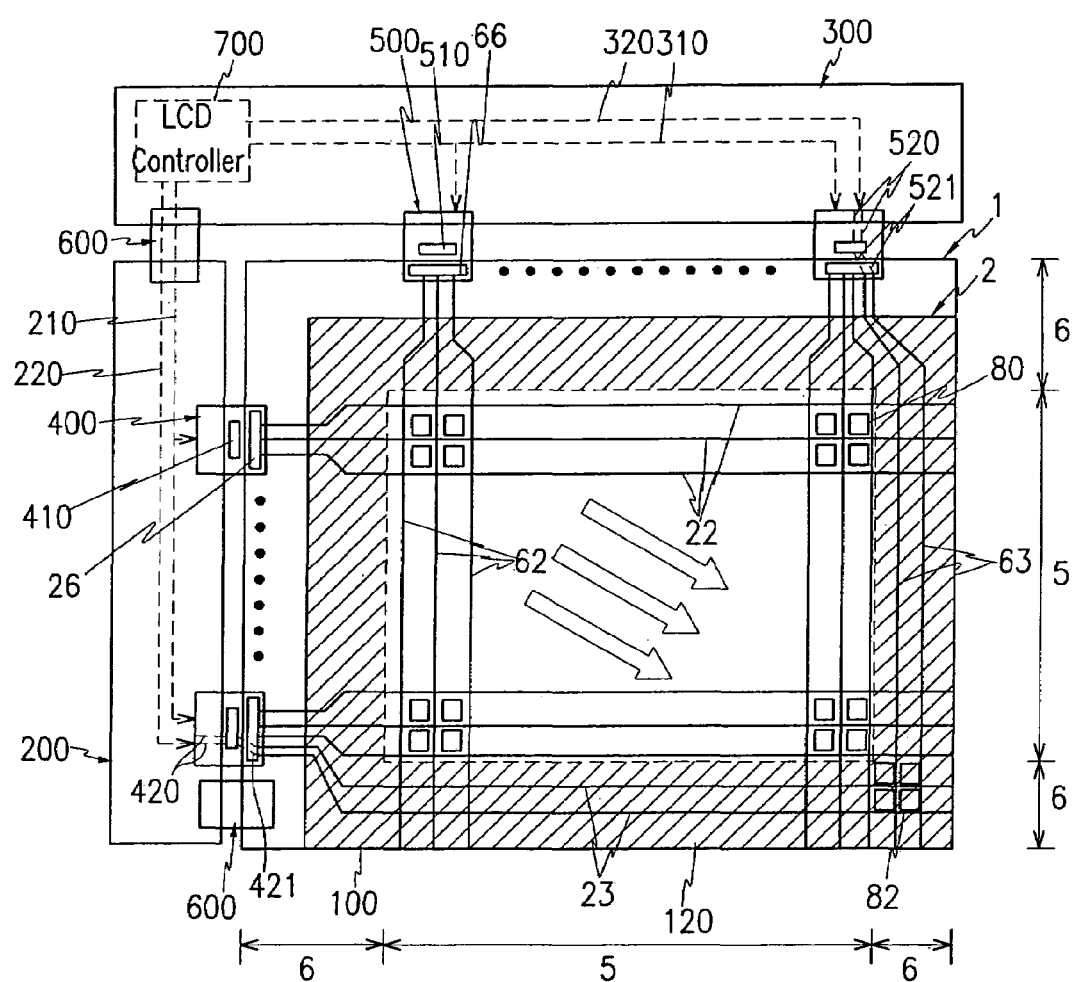

FIGS. 5 to 7 are plan views of LCDs according to embodiments of the present invention, and FIG. 8 is a cross-sectional view of LCDs taken along the line VIII–VIII' in FIGS. 5 to 7. FIGS. 9 and 11 are plan views of LCDs according to other embodiments of the present invention.

As shown in FIGS. 5 to 11, LCDs according to these embodiments have the same structures as those shown in FIGS. 1–4 except for pixel electrodes, additional gate lines, additional data lines and some signal paths and connections.

Figure 10:
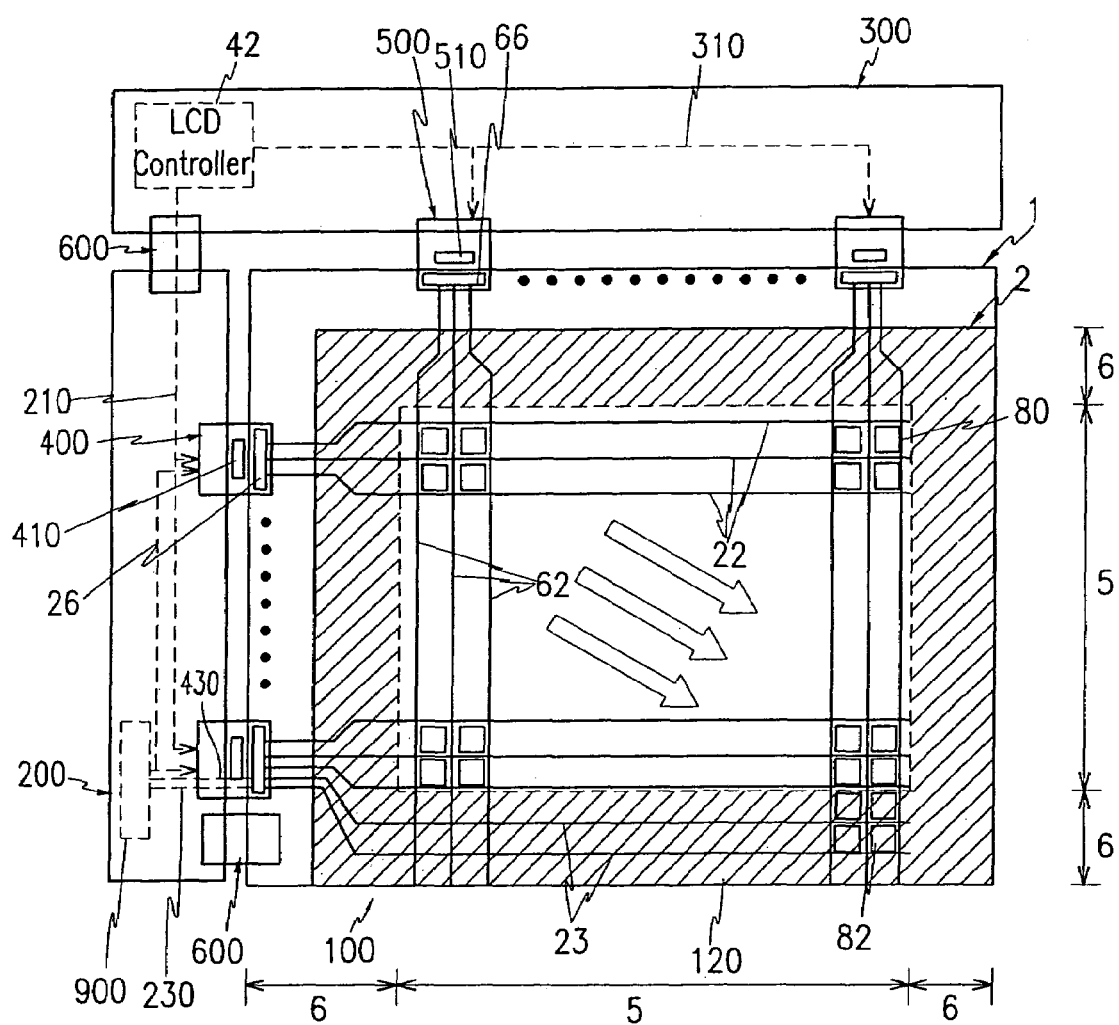

As shown in FIGS. 5 to 11, a plurality of additional pixel electrodes 82 as well as a plurality of normal pixel electrodes 80, preferably both having the same shapes are formed on a TFT array panel 1, preferably by using the same method. The normal pixel electrodes 80 are located within a display area 5, while the additional pixel electrodes 82 are located in a peripheral area 6 out of the display area 5 to overlap a black matrix 120 on a color filter panel 2. The additional pixel electrodes 82 are disposed near the locations where the rubbing of an aligning film 90 finishes. In these embodiments, since the aligning film 90 is rubbed in a direction from the upper left side to the lower right side indicated by arrows as shown in FIGS. 5 to 7 and 9 to 11, the additional pixel electrodes 82 are disposed at the right edge as shown in FIGS. 5–7, at the lower edge as shown in FIGS. 9 and 10, or both at the right edge and the lower edge as shown in FIG. 11.

In order to supply signals to the additional pixel electrodes 82, a plurality of additional signal lines such as a plurality of additional data lines 63 and a plurality of additional gate lines 23 are provided. Two additional data lines 63 and their pads are provided near the additional pixel electrodes 82 disposed at the right side as shown in FIGS. 5–8, or two additional gate lines 23 and their pads are provided near the additional pixel electrodes 82 located at the lower side as shown in FIGS. 9 and 10. In particular, two additional gate lines 23 and two additional data lines 63 as well as their pads are provided when the additional pixel electrodes 82 are located at both the right side and the lower side, as shown in FIG. 11.

The additional data lines 63 are parallel to normal data lines 62 electrically connected to the normal pixel electrodes 80, while the additional gate lines 23 are parallel to normal gate lines 22 electrically connected to the normal pixel electrodes 82. Preferably, the additional gate lines 23, the additional data lines 63 and their pads have the same shapes and are formed by the same method as the normal gate lines 22, the normal data lines 62 and their pads 26 and 66.

A plurality of additional TFTs (not shown) are also provided in the TFT array panel 1 for electrically connecting the additional pixel electrodes 82 to the additional gate lines 23 and/or the additional data lines 63. Preferably, the additional TFTs have the same shapes and are formed by the same method as normal TFTs connected to the normal pixel electrodes 80.

Each additional TFT has a source electrode connected to one of the additional data lines 63 and the normal data lines 62, a drain electrode connected to one of the additional pixel electrodes 82 and a gate electrode connected to one of the normal gate lines 22 and the additional gate lines 23. The additional TFTs supply signals from the additional data lines 63 or the normal data lines 62 to the additional pixel electrodes 82 in response to signals from the normal gate lines 22 or the additional gate lines 23.

As shown in FIGS. 5–9 and 11, an additional signal path or signal paths such as 320 and 220 preferably made of conducting wires for electrically connecting the additional signal lines 63 and/or 23 to an LCD controller 700 are provided on a data PCB 300 and/or a gate PCB 200 and/or an FPC film 600. FIGS. 5–11 illustrates the LCD controller 700 provided at the data PCB 200.

As shown in FIGS. 5–7, an additional signal path 320 is provided on the data PCB 300 to electrically connect the additional data lines 63 and the LCD controller 700. On the contrary, an additional signal path 220 is provided on a gate PCB 200, the data PCB 300 and a FPC film 600 to electrically connect the additional gate lines 63 and the LCD controller 700, as shown in FIG. 9. In the meantime, FIG. 11 shows two additional signal paths 320 and 220 shown in FIGS. 5–7 and 9, respectively.

Referring to FIGS. 5 and 11, a plurality of additional input/output terminals are provided at one of the data driving ICs 510, and a plurality of additional lead wires 520 and 521 connected to the additional input/output terminals of the data driving IC 510 are provided on one of the data TCPs 500, which carries the data driving IC 510 with the additional input/output terminals. Two additional input/output terminals are electrically connected to the additional signal path 320, which in turn is connected to the LCD controller 700, via the additional lead wires 520, and other two additional input/output terminals are electrically connected to the additional data pads via the additional lead wires 521.

Referring to FIGS. 6 and 7, a plurality of additional lead wires 530 are provided on one of the data TCPs 500. The additional lead wires 530 shown in FIG. 6 are directly connected between the additional data pads and the additional signal path 320, which in turn is connected to the LCD controller. Referring to FIG. 7, a voltage level shifter 800 and two connections 330 connected to output terminals of the voltage level shifter 800 are further provided at the data PCB 300. The additional signal path 320 is connected between the LCD controller 700 and the voltage level shifter 800, and the connections 330 are connected between the voltage level shifter 800 and the additional lead wires 530, which in turn are connected to the additional data pads. The voltage level shifter 800 increases the voltage level of signals from the LCD controller 700, and may be substituted with other external circuits.

Referring to FIGS. 9 and 11, a plurality of additional input/output terminals 420 are provided at one of the gate driving ICs 410, and a plurality of additional lead wires 420 and 421 connected to the additional input/output terminals of the gate driving IC 410 are provided on one of the gate TCPs 400, which carries the gate driving IC 410 with the additional input/output terminals. Two additional input/output terminals are electrically connected to the additional signal path 220 via the additional lead wires 420, and other two additional input/output terminals electrically connected to the additional gate pads via the additional lead wires 421. Since the LCD controller 700 is provided on the data PCB 300, the additional signal path 220 includes conducting wires formed on the data PCB 300, on the FPC film 600 disposed between the gate PCB 200 and the data PCB 300, and on the gate PCB 200.

According to another embodiment of the present invention, lead wires directly connecting the additional signal path 220 and the additional gate pad 430 are provided on one of the gate TCPs 400.

According to still another embodiment of the present invention, a voltage level shifter having an input terminal connected to the additional signal path 220 and a plurality of connections connected between output terminals of the voltage level shifter and the lead wires of the gate TCP 400 are provided on the gate PCB 200. In this manner, a voltage level of a signal provided from the LCD controller 700 for the additional gate lines 23 can be increased to turn on the additional TFTs.

In the meantime, an LCD shown in FIG. 10 has no signal path between an LCD controller 700 and the additional gate lines 23. Instead, a driving voltage generator 900 and two connections 230 connected to the driving voltage generator 900 is provided at a gate PCB 200. Two additional lead wires 430 connected between the connections 230 and the additional gate lines 23 are provided on one of the gate TCPs 400. The driving voltage generator 900 provides a gate-on voltage and a gate-off voltage for the additional gate lines 23.

The LCDs shown in FIGS. 5–11 cause the impurity ions on the surface of the aligning layers 90 and 100 to travel along the alignment direction (along the direction indicated by the arrows shown in FIGS. 5 to 7 and 9 to 11) and to stay at the additional pixel electrodes 82 external to the display area 5. Therefore, the image defect area formed by such impurity ions is screened by the black matrix 120.

On the other hand, a constant DC signal or an alternating signal periodically inverting its polarity may be applied to the common electrode 130. Periodically inverting the polarity of the signal applied to the common electrode 130 as well as those of image signals enables a liquid crystal layer associated with the normal pixel electrodes and the additional pixel electrodes to be driven with a low voltage less than 5V. Such an alternating signal may be provided by using the LCD controller 700 or the voltage level shifter 800.

Although preferred embodiments of the present invention have been described in detail hereinabove, it shall be clearly understood that many embodiments having variations and/or modifications of the basic inventive concepts herein taught are possible, which may appear to those of ordinary skill in the pertinent art based on the teachings herein. Such embodiments will fall within the spirit and scope of the present invention, as defined in the appended claims.

What is claimed is:

1. A method for forming a liquid crystal dispay, the method comprising:
   providing a first insulating substrate having a display area and a perpneral area;
   aligning a plurality of gate signal lines substantially extending in a row direction of the substrate;
   aligning a plurality of data signal lines substantially extending in column direction of the substrate;
   locating at least one first pixel electrode with a first portion thereof in the peripheral area and a second portion thereof in the display area; and
   locating at least one second pixel electrode in the display area, wherein a larger portion of the gate and data signal lines is disposed in the display area rather than in the peripheral area.

2. A method as defined in claim 1, further comprising providing a second insulating substrate disposed opposite to the first insulating substrate wherein the second insulating substrate comprises a black matrix that screens the first portion of the at least one first pixel electrode.

3. A method as defined in claim 1 wherein the first insulating substrate comprises an aligning film, the method further comprising rubbing the aligning film in a rubbing direction directed to the first portion of the at least one first electrode.

4. A method as defined in claim 1, further comprising:
   arranging a plurality of pixel electrodes comprising the at east one first pixel electrode and the at least one second pixel electrode into a matrix.

5. A liquid crystal display comprising: first insulating means for insulating having a display area and a peripheral area;
   gate signaling means for signaling along a plurality of gate signal lines substantially extending in a row direction of the first insulating means;
   data signaling means for signaling along a plurality of data signal lines substantially extending in a column direction of the first insulating means;
   first pixel means for transmitting through at least one first pixel electrode with a first portion thereof in the peripheral area and a second portion thereof in the display area; and
   second pixel means for transmitting through at least one second pixel electrode in the display area,
   wherein a larger portion of the gate and data signaling means is disposed in the display area rather than in the peripheral area.

6. A liquid crystal display as defined in claim 5, further comprising second insulating means for insulating disposed opposite to the first insulating means wherein the second insulating means comprises a black matrix means for screening the first portion of the at least one first pixel electrode.

7. A liquid crystal display as defined in claim 5 wherein the first insulating means comprises aligning means, the aligning means having a rubbing direction disposed towards the first portion of the at least one first electrode.

8. A liquid crystal display as defined in claim 5, further comprising:
   matrix means for maintaining a plurality of pixel electrodes comprising the at least one first pixel electrode and the at least one second pixel electrode in a matrix arrangement;
   matrix gate means for signaling along a plurality of gate signal lines substantially parallel to each other and extending in a row direction of the matrix; and
   matrix data means for signaling along a plurality of data signal lines substantially parallel to each other and extending in a column drection of the matrix.

9. A liquid crystal display comprising:
   a first insulating substrate including a display area as a screen and a peripheral area external to the display area;
   a plurality of signal lines provided on the first substrate; and
   a plurality of pixel electrodes electrically connected to the signal lines, wherein the plurality of pixel electrodes includes at least one first electrode having a first portion located in the peripheral area and at least one second electrode located in the display area and the at least one first electrode further includes a second portion located in the display area.

10. The liquid crystal display of claim 9, wherein the plurality of pixel electrodes are arranged in a matrix, and the plurality of the signal lines include a plurality of gate lines substantially parallel to each other and extending in a row direction and a plurality of data lines substantially parallel to each other and extending in a column direction, and the liquid crystal display further comprises a plurality of switching elements transmitting first signals from the plurality of data lines to the plurality of pixel electrodes in response to second signals from the plurality of gate lines.

11. The liquid crystal display of claim 9, wherein the at least one first electrode is located at an edge column of the matrix.

12. A liquid crystal display comprising:
   a first insulating substrate having a display area and a peripheral area;
   a plurality of gate signal lines substantially extending in a row direction of the substrate;
   a plurality of data signal lines substantially extending in a column direction of the substrate;
   at least one first pixel electrode with a first portion thereof in the peripheral area and a second portion thereof in the display area; and
   at least one second pixel electrode in the display area,
   wherein a larger portion of the gate and data signal lines is disposed in the display area rather than in the peripheral area.

13. A liquid crystal display as defined in claim 12, further comprising a second insulating substrate disposed opposite to trie frst insulating substrate wherein the second insulating substrate comprises a black matrix that screens the first portion of the at least one first pixel electrode.

14. A liquid crystal display as defined in claim 12, further comprising an aligning film on the first insulating substrate, the aligning film having a rubbing direction disposed towards the first portion of the at least one first electrode.

15. A liquid crystal display as defined in claim 12, further comprising:

a plurality of pixel electrodes comprising the at least one first pixel electrode and the at least one second pixel electrode into a matrix;

a plurality of gate signal lines substantially parallel to each other and extending in a row direction of the matrix; and a plurality of data signal lines substantially parallel to each other and extending in a column direction of the matrix.

* * * * *